though the grounded zone of test pieces for the insulating materials is flat, a funnel-like depression is made as shown in the drawing accompanying this specification. The drawing shows a test piece in the form of a disc of insulating material 1 to which a flat counterelectrode 2 is applied and which has a funnel-like depression in which there is an electrode 3 supplied with a voltage. The section A–A' through the axis of rotation of the funnel shows the electrode configuration.

United States Patent
Wuerstlin et al.

[15] 3,669,888
[45] June 13, 1972

| | | | |
|---|---|---|---|
| [54] | ELECTRICAL INSULATING MATERIALS BASED ON OLEFIN POLYMERS | | |
| [72] | Inventors: | Franz Wuerstlin; Franz Feichtmayr, both of Ludwigshafen; Heinz Eilingsfeld, Frankenthal, all of Germany | |
| [73] | Assignee: | Badische Anilin- & Soda-Fabrik Aktiengesellschaft, Ludwigshafen/Rhine, Germany | |
| [22] | Filed: | June 11, 1969 | |
| [21] | Appl. No.: | 832,107 | |
| [30] | Foreign Application Priority Data | | |
| | June 14, 1968 | Germany | P 17 65 583.3 |
| [52] | U.S. Cl. | | 252/63.2, 252/63.7, 260/45.9 R |
| [51] | Int. Cl. | | C08f 45/60, H01b 3/18 |
| [58] | Field of Search | | 252/63.2, 63.7; 260/45.9, 45.85 |

[56] References Cited

UNITED STATES PATENTS

| | | | |
|---|---|---|---|
| 2,827,450 | 3/1958 | Towne et al. | 260/152 |
| 3,522,183 | 7/1970 | Heidt | 252/63.7 |
| 2,997,455 | 8/1961 | Broich et al. | 260/45.9 |
| 3,079,366 | 2/1963 | Boyle et al. | 260/45.9 |
| 3,139,451 | 6/1964 | Dexter et al. | 260/465 |
| 3,318,842 | 5/1967 | Blachere et al. | 260/45.85 |

FOREIGN PATENTS OR APPLICATIONS

| | | |
|---|---|---|
| 909,843 | 11/1962 | Great Britain |
| 1,114,603 | 5/1968 | Great Britain |

*Primary Examiner*—John T. Goolkasian
*Assistant Examiner*—Robert A. Dawson
*Attorney*—Johnston, Root, O'Keeffe, Keil, Thompson & Schurtleff

[57] ABSTRACT

Electrical insulating materials based on olefin polymers and containing agents for increasing their electric strength. The electrical insulating materials according to the invention contain anilines bearing special substituents as the agents for increasing electric strength.

3 Claims, 1 Drawing Figure

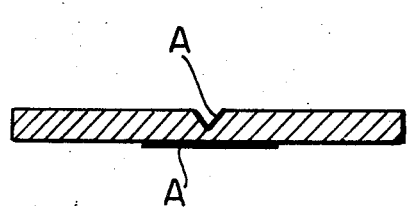

ELECTRICAL INSULATING MATERIALS BASED ON OLEFIN POLYMERS

The present invention relates to electrical insulating compositions based on olefin polymers and containing agents for increasing electric strength.

Conventional electrical insulating materials (i.e., those without agents for increasing electric strength) based on olefin polymers are known to have a number of advantages over comparable other electrical insulating materials. They have the disadvantage however that they have fairly poor electric strength, i.e., that insulations prepared therefrom fail under the influence of a fairly high electric potential after only a short time or, in other words, have a short life. This property makes conventional electrical insulating compositions based on olefin polymers unsuitable for high-voltage applications, and particularly unsuitable as insulating materials for high-tension cables because in this application long life of the insulation under high electric field strengths is an essential prerequisite.

It is known from British Pat. specifications Nos. 1,083,113 and 1,083,114 that this disadvantage can be overcome by adding to the polyolefin-based electrical insulating materials special agents for increasing their electric strength. These agents are chemical compounds which contain groups having a strong conjugation effect, particularly compounds which contain one or more nitro groups with or without other reactive groups. The use of such compounds is accompanied by a number of other disadvantages; the compounds may be injurious to health and/or explosive; they may give rise to undesirable secondary reactions in insulating materials containing peroxides; or they may be solid with the consequent risk of separation (efflorescence, formation of nodules). Since incorporation of the agent into the insulating composition and the processing of the insulating composition itself have to be carried out at fairly high temperatures (olefin polymers have fairly high melting points) the first-mentioned disadvantages are particularly serious (risk of poisoning, risk of explosion, risk of decomposition of peroxide).

The present invention has for its object to provide electrical insulating materials of the above mentioned type which do not have the said disadvantages or have them to a greatly decreased extent.

We have found that this object is achieved by using anilines bearing special substituents as agents for increasing electric strength.

The invention therefore consists in polyolefin-based electrical insulating compositions which contain an agent for increasing electric strength. Compositions in accordance with this invention contain, as the agent for increasing electric strength, a compound having the general formula:

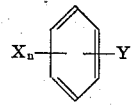

where $n$ denotes zero or one of the integers 1 to 5;

X denotes a $C_1$ to $C_4$ alkyl group, a $C_1$ to $C_4$ oxaalkyl group, a $-NH_2$ group, or an $-OH$ group or has the same meanings as Y; and Y denotes the group

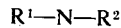

where $R^1$ denotes a hydrogen atom, an aliphatic, aromatic, aromatic-aliphatic or aliphatic-aromatic hydrocarbon group having not more than 10 carbon atoms and in which from one to three of the hydrogen atoms may be replaced by a halogen atom, a nitrile group, a hydroxyl group, an alkyl—O— group, an alkyl—CO—O— group, an alkyl—O—CO— group or an alkyl—O—CO—O— group, each having from one to six carbon atoms in the alkyl radical; and $R^2$ denotes an alkyl group having from one to 10 carbon atoms in which one or two hydrogen atoms may be replaced by a halogen atom, a nitrile group, a hydroxyl group, an alkyl—O— group, an alkyl—CO—O— group, an alkyl—O—CO— group or an alkyl—O—CO—O— group, each having from one to six carbon atoms in the alkyl radical;

with the proviso that not more than two of the radicals X have the same meanings as Y.

Compounds (anilines) of the said general formula which are well suited for the purposes of this invention are those in whose formula:

$n$ denotes zero or one of the integers 1 or 2 and preferably denotes the integer 1;

X denotes a $C_1$ to $C_2$ alkyl group or a $C_1$ oxaalkyl group or has the same meaning as Y and preferably denotes a $C_1$ to $C_2$ alkyl group;

$R^1$ denotes a hydrogen atom or a methyl group;

$R^2$ denotes an alkyl group having two carbon atoms, one hydrogen atom (the $\beta$-hydrogen atom) of this alkyl group having been replaced by an alkyl—O—CO— group having one to two carbon atoms in the alkyl radical.

Specific examples of suitable anilines are:

N-methyl-N-(2-carboxymethylethyl)-aniline,
N-ethyl-N-(2-carboxyisobutylethyl)-aniline,
N-methyl-N-(2-carboxymethylethyl)-2,5-dimethylaniline,
N-(2-phenylethyl)-N-(2-carboxymethylethyl)-3-methylaniline,
N-(2-cyanoethyl)-N-(2-acetoxyethyl)-aniline,
N-(2-phenylethyl)-aniline and
N-ethyl-N-(2-cyanoethyl)-aniline.

In every case it is advantageous if the anilines are liquid at room temperature (20° C). It has further been found to be advantageous for the anilines to be used in an amount of from 0.5 to 5 percent by weight, preferably from 1 to 3 percent by weight, with reference to the total weight of the insulating composition.

The electrical insulating materials according to the invention are based on olefin polymers. For the purposes of this invention, olefin polymers are defined as those conventionally understood by this term (cf. for example the abovementioned British Patent specifications). It includes in particular homopolymers and copolymers of ethylene, especially polyethylenes having a density of from 0.918 to 0.960, preferably a density of about 0.920. In addition to the olefin polymer, the insulating compositions may contain conventional auxiliaries and additives, for example crosslinking agents such as peroxides; stabilizers against thermal degradation; light stabilizers; carbon black and other pigments or fillers.

Production of the insulating materials from their components may be carried out in a conventional way with conventional equipment; particularly by homogenizing at temperatures of from 150° to 170° C in screw or roller mixing equipment.

Electrical insulating compositions according to this invention are particularly suitable for cables and especially for high-tension cables.

The invention is illustrated by the following examples. Parts and percentages specified in the examples are by weight.

The drawing illustrates a test disc hereinafter described.

The measured value referred to as "number of breakdowns" in the examples is determined as follows: circular test discs are prepared in a press by a conventional method from the insulating material; they have a diameter of 69 mm and a thickness of 5 mm and are provided with a central conical depression (depth of cone 4 mm, vertex angle of the cone 50°). The conical depression and a part of the flat surface on the reverse side (on a circle having a diameter of 25 mm) are metallized with silver (about 0.1 mm in thickness) (of the drawing, reference A). The two metal layers serve as electrodes in the electric strength test, high voltage being applied to the conical electrode by a needle, whereas the flat electrode A on the reverse side is grounded. All tests are carried out beneath the surface of oil.

An effective voltage of 20 kilovolts (50 cycles per second) is applied to 10 test discs of each type for 1 hour and the number of test discs which have failed is indicated in the appropriate column in the table of the examples. The remaining test discs (i.e., those which have not failed) are then subjected to an effective voltage of 25 kilovolts (50 cycles per second) for 1 hour and again the number of breakdowns is noted. Test discs which still have not failed are subjected to an effective load of 30 kilovolts (50 cycles per second) for 1 hour and again the number of breakdowns is registered. In Example 1 the series is continued at an effective load of 35, then 40 and then 45 kilovolts (50 cycles per second), in each case for 1 hour. It may be seen for example from the table in Example 1 that polyethylene stabilized according to this invention withstands the first three voltage stages without breakdown and only in the fourth stage two of the total of 10 test discs (= 20 percent), in the fifth stage seven (= 70 percent) and in the sixth stage the last (10 percent) of the discs fail. On the other hand, the same polyethylene which does not however contain an agent according to this invention fails to the extent of 80 percent (eight tests discs) in the first voltage stage and to the extent of 20 percent (two test discs) in the next stage.

EXAMPLE 1

One-hundred parts of a commercial granulated polyethylene having a density of 0.920 is mixed in a conventional manner on a mixing roller at a temperature of 160° C with 2 parts of N-methyl-N-(2-carboxymethylethyl)-aniline to give a homogeneous mixture. Test discs of the type defined above are made from the composition thus obtained.

For comparison, the same procedure is followed but without using N-methyl-N-(2-carboxymethylethyl)-aniline.

Measured values obtained on the test discs are reproduced in the following table:

|  | Number of breakdowns at | | | | | |
| --- | --- | --- | --- | --- | --- | --- |
|  | 20 kv | 25 kv | 30 kv | 35 kv | 40 kv | 45 kv |
| Example 1 | 0 | 0 | 0 | 2 | 7 | 1 |
| Blank test | 8 | 2 | — | — | — | — |

EXAMPLES 2 to 6

The procedure followed is completely analogous to that in Example 1 but the types and amounts of anilines indicated in the following table are used. The measured values obtained are also given in the table. In the Table:

ECEA = N-ethyl-N-(2-carboxyisobutylethyl)-aniline
MCED = N-methyl-N-(2-carboxymethylethyl)-2,5-dimethylaniline
PCEM = N-(2-phenylethyl)-N-(2-carboxymethylethyl)-3-methylaniline
CAEA = N-(2-cyanoethyl)-N-(2-acetoxyethyl)-aniline
PA = N-(2-phenylethyl)-aniline

| Example | Aniline | | Number of breakdowns at | | |
| --- | --- | --- | --- | --- | --- |
|  | Type | Parts | 20 kv | 25 kv | 30 kv |
| 2 | ECEA | 2 | 0 | 0 | 0 |
| 3 | MCED | 2 | 0 | 0 | 0 |
| 4 | PCEM | 2 | 0 | 0 | 0 |
| 5 | CAEA | 2 | 0 | 0 | 1 |
| 6 | PA | 2 | 0 | 0 | 0 |

What we claim is:

1. An electrical insulating composition comprising an olefin polymer containing, as an agent for increasing the electric breakdown strength thereof, 0.5 to 5 percent by weight, with reference to the total insulating composition of a member selected from the group consisting of N-methyl-N-(2-carboxymethylethyl)-aniline; N-ethyl-N-(2-carboxyisobutylethyl)-aniline; N-methyl-N-(2-carboxymethylethyl)-2,5-dimethylaniline; N-(2-phenylethyl)-N-(2-carboxymethylethyl)-3-methylaniline; N-(2-cyanoethyl)-N-(2-acetoxyethyl)-aniline; N-(2-phenylethyl)-aniline; and N-ethyl-N-(2-cyanoethyl)-aniline.

2. An electrical insulating composition as claimed in claim 1 wherein the said percentage is from 1 to 3 percent by weight.

3. A composition as claimed in claim 1 wherein the olefin polymer is a polyethylene having a density of from 0.918 to 0.960.

* * * * *